(12) United States Patent
Kwak et al.

(10) Patent No.: US 8,208,967 B2
(45) Date of Patent: *Jun. 26, 2012

(54) MOBILE COMMUNICATION TERMINAL WHICH DISPLAYS SCREEN LOCATION INFORMATION AND METHOD OF CONTROLLING THE MOBILE COMMUNICATION TERMINAL

(75) Inventors: Jae Do Kwak, Seoul (KR); Hee Soo Kim, Inchun-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,038

(22) Filed: Aug. 22, 2011

(65) Prior Publication Data

US 2011/0300913 A1 Dec. 8, 2011

Related U.S. Application Data

(63) Continuation of application No. 11/874,504, filed on Oct. 18, 2007, now Pat. No. 8,024,005.

(30) Foreign Application Priority Data

Oct. 20, 2006 (KR) .................. 10-2006-0102494

(51) Int. Cl.
*H04M 1/00* (2006.01)
*H04B 1/38* (2006.01)

(52) U.S. Cl. ..................................... 455/566
(58) Field of Classification Search ............... 455/566, 455/550.1, 90.1–90.3, 457, 556.1, 556.2, 455/557; 382/232, 305
See application file for complete search history.

(56) References Cited

U.S. PATENT DOCUMENTS 7,016,704 B2 3/2006 Pallakoff
8,024,005 B2 * 9/2011 Kwak et al. ............ 455/566

FOREIGN PATENT DOCUMENTS

KR 10-2005-0088022 A 9/2005
* cited by examiner

*Primary Examiner* — Eugene Yun
(74) *Attorney, Agent, or Firm* — Birch, Stewart, Kolasch & Birch, LLP (57) ABSTRACT

A mobile communication terminal including a display module configured to display a portion of a display object; and a control module configured to control the display module to display screen location information using a first box and a second box, the screen location information indicating a relative location of the portion of the display object with respect to an entire portion of the display object. Further, the control module is further configured to control the display module to move or enlarge/reduce the second box by moving or enlarging/reducing the display object in response to a touching manner of the display module, and the second box is disposed inside the first box and represents the relative location and a size of the portion of the display object with respect to the entire portion of the display object.

16 Claims, 7 Drawing Sheets

MOBILE COMMUNICATION TERMINAL WHICH DISPLAYS SCREEN LOCATION INFORMATION AND METHOD OF CONTROLLING THE MOBILE COMMUNICATION TERMINAL

This application is a Continuation of application Ser. No. 11/874,504 filed on Oct. 18, 2007, now U.S. Pat. No. 8,024,005, which claims priority from Korean Patent Application No. 10-2006-102494 filed on Oct. 20, 2006 in the Korean Intellectual Property Office, the disclosure of which is incorporated herein by reference in its entirety.

BACKGROUND OF THE INVENTION

1. Field of the Invention

The present invention relates to a mobile communication terminal which displays screen location information and a method of controlling the mobile communication terminal, and more particularly, to a mobile communication terminal which displays a portion of a display object and screen location information regarding the relative location of the display object portion to the entire display object using a display module, and a method of controlling the mobile communication terminal.

2. Description of the Related Art

With improvements in the multimedia functions of mobile communication terminals, users can nowadays enjoy a variety of multimedia screens using their mobile communication terminals. In particular, due to recent improvements in the functions of display modules for mobile communication terminals, users now can watch not only menus screens but also various Internet screens and moving images such as movies or animation films using their mobile communication terminals.

However, due to the miniaturization of mobile communication terminals and restrictions on the size of display modules for mobile communication terminals, mobile communication terminals often may not be able to display a display object desired by a user as a whole on their screen.

Figure 1:
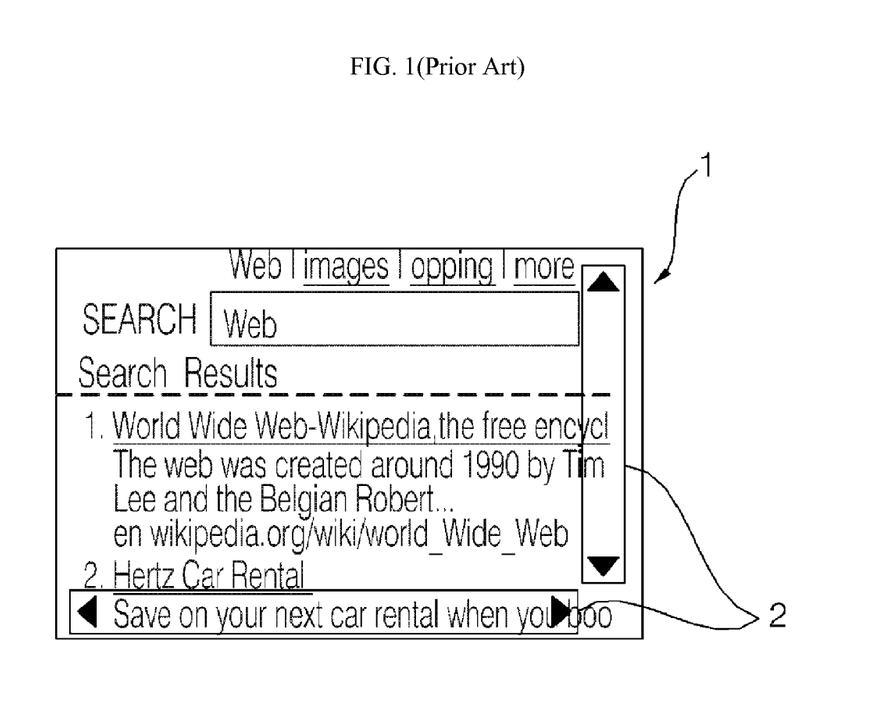
FIG. 1 illustrates a screen displayed by a display module of a conventional mobile communication module.

FIG. 1 illustrates that only a portion of an Internet web page desired by a user is displayed on a screen 1 of a conventional mobile communication terminal Referring to FIG. 1, the user may not be able to recognize which part of the Internet web page is currently being displayed on the screen 1 until he/she scrolls up and down the Internet web page using a scroll bar 2 which is disposed on one side of the display screen 1 or at the bottom of the display screen 1.

Conventionally, when only a portion of a display object is displayed on the screen of a mobile communication terminal, a user may not be able to readily determine how much of the display object remains to be displayed and thus suffer inconvenience. In addition, the scrolling of a display object which is too large to be displayed as a whole on a screen and is thus displayed only partially may result in a prolonged screen loading and consume a considerable amount of power within a relatively short period of time.

SUMMARY OF THE INVENTION

The present invention provides a mobile communication terminal which displays a portion of a display object and screen location information regarding the relative location of the display object portion to the entire display object using a display module, and a method of controlling the mobile communication terminal.

According to an aspect of the present invention, there is provided a mobile communication terminal which displays screen location information, the mobile communication terminal including a display module which displays a portion of a display object; and a control module which controls the display module to display screen location information regarding the relative location of the display object portion to the entire display object.

According to another aspect of the present invention, there is provided a mobile communication terminal which displays screen location information, the mobile communication terminal including a display module which displays a display object and a portion of the display object; and a control module which controls the display module to display screen location information regarding the relative location of the display object portion to the entire display object.

According to another aspect of the present invention, there is provided a method of controlling a mobile communication terminal which displays screen location information, the method including displaying a portion of a display object; and displaying screen location information regarding the relative location of the display object portion to the entire display object.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 2:
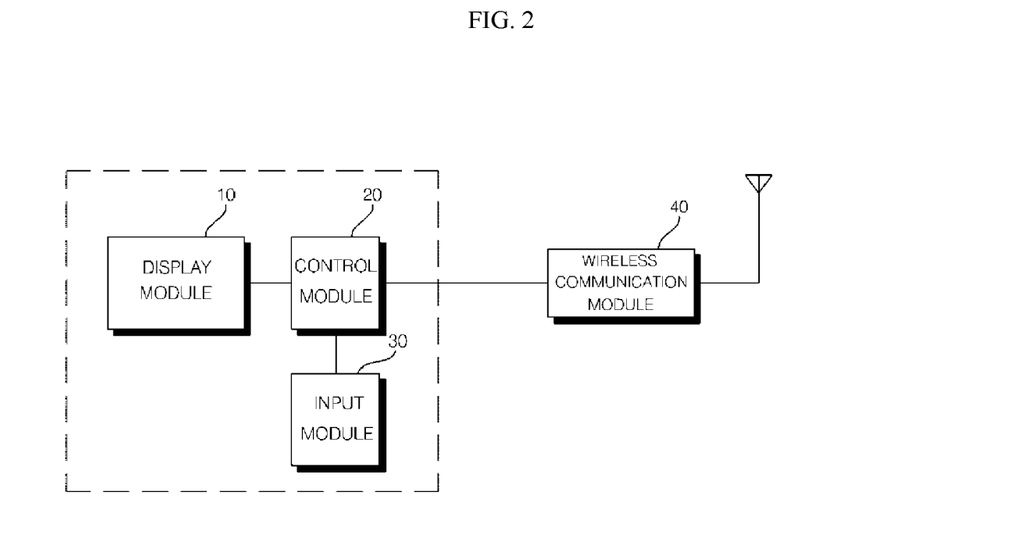
FIG. 2 illustrates a block diagram of a mobile communication terminal according to an embodiment of the present invention.

Referring to FIG. 2, a mobile communication terminal includes a display module 10 which displays a display object, a control module 20 which processes an image signal so that the display module 10 can display a screen, and an input module 30 to which a command to drive the mobile communication terminal can be input.

The display module 10 may include a display portion such as a liquid crystal display (LCD) or an organic light emitting diode (OLED) which is widely adopted in the manufacture of mobile communication terminals; and a display driver which drives the display portion based on an image signal processed by the control module 20. Examples of the display portion include various display devices, other than those set forth herein.

The input module 30 may include a keypad. If the display module 10 includes a touch pad or a touch screen to which various commands can be input, the input module 30 may be integrated into the display module 10. In this case, the control module 20 determines whether the touch pad or the touch screen has been touched. Then, if it is determined that the touch pad or the touch screen has been touched, the control module 20 determines that a command corresponding to the coordinates of a location on the touch pad or the touch screen that is determined to have been touched has been.

The mobile communication terminal may also include a wireless communication module 40 which transmits/receives wireless signals via an antenna. The wireless communication module 40 provides an interface for wireless communication with a base station through the antenna. Further, the wireless communication module 40 may include a duplex filter for filtering a signal received through the antenna, a power amplifier for amplifying a transmit signal, a frequency up-convert circuit in a transmission path, and a frequency down-convert circuit in a reception path.

The control module 20 controls the display module 10 to display various types of screens. For example, the control module 20 may control the display module 10 to display web pages. Web pages may be downloaded into and then stored in the mobile communication terminal using a wired communication method. The control module 20 may control the display module 10 to display web pages stored in the mobile communication terminal.

In a case where a user is provided with a wireless Internet service via the mobile communication terminal, data that constitutes a web page is downloaded into the mobile communication terminal via the wireless communication module 40. Then, the control module 20 configures a web page screen based on the downloaded data and controls the display module 10 to display the web page screen.

Figure 3:
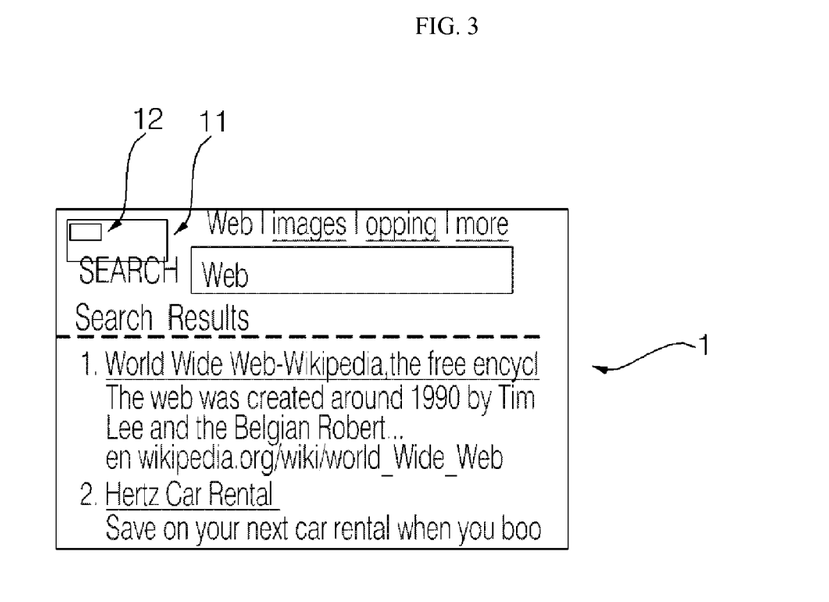
FIG. 3 illustrates a screen displayed by a display module of a mobile communication module according to an embodiment of the present invention.

FIG. 3 illustrates a screen displayed by the display module 10 of FIG. 2. Referring to FIG. 3, a portion of a display object desired by a user is displayed on a display screen 1 of the display module 10. According to the embodiment of FIG. 2, a portion of a web page desired by the user is displayed on the display screen 1 at the request of the user. In this case, the user may not be able to determine exactly which part of the desired web page is currently being displayed on the display screen 1 by using a conventional method. Therefore, the control module 20 displays at an upper portion of the display screen 1 screen location information regarding the relative location of a web page portion (hereinafter referred to as the current web page portion) currently being displayed on the display screen 1 to the desired web page.

More specifically, the control module 20 displays the screen location information using a navigation window which includes a first box 11 and a second box 12 that is disposed in the first box 11. The size and location of the second box 12 may be determined according to the relative size and relative location of the current web page portion to the desired web page.

For example, if the current web page portion corresponds to an upper left portion of the desired web page, the second box 12 may be located near the upper left corner of the first box 11. If the current web page portion accounts for 25% of the desired web page, the size of the second box 12 may be 25% of the size of the first box 11.

However, the ratio of the size of the second box 12 to the size of the first box 11 is not restricted to that set forth herein. In other words, the relative size of the second box 12 to the first box 11 may be arbitrarily determined as long as the user can easily recognize the relative location or the relative size of the current web page portion to the desired web page.

According to the embodiment of FIG. 3, the display module 10 displays the first box 11 and the second box 12 as transparent windows. Thus, the user has no difficulty viewing the current web page portion which underlies the first box 11 and the second box 12.

Figure 4:
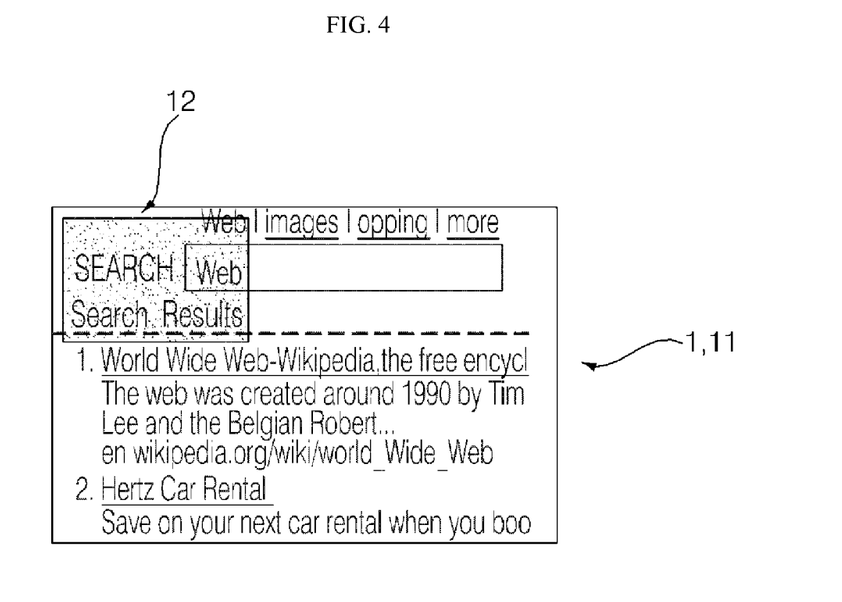
FIG. 4 illustrates a screen obtained by varying the size of a navigation window of FIG. 3.

The size of the first box 11 may be set to be the same as that of the display screen 1 of the display module 10, as illustrated in FIG. 4. In this case, the user can visually recognize only the second box 12.

When the size of the first box 11 is the same as that of a screen that can be displayed by the display module 10, the user may determine the relative location and size of the current web page portion to the desired web page based on the relative location and size of the second box 12 to the display screen 1. In other words, it is possible to provide the user with information regarding the relative location and size of the current web page portion to the entire screen by using only one box.

Figure 5:
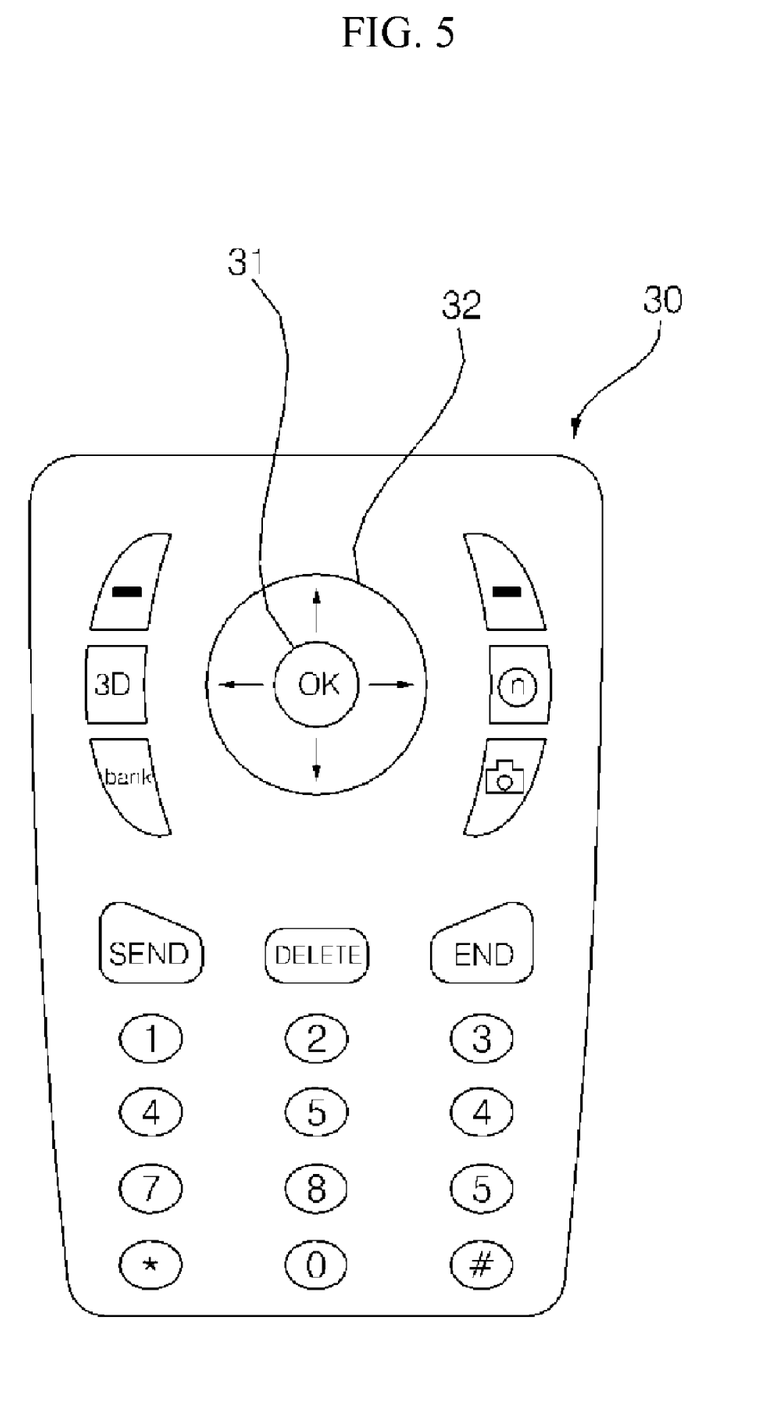
FIG. 5 illustrates an input module which is capable of varying the size of the navigation window of FIG. 3.

FIG. 5 illustrates an input module 30 for inputting a command to a mobile communication terminal according to an embodiment of the present invention. Referring to FIG. 5, a user may input a command to a mobile communication module using a keypad.

The user may select the second box 12 by manipulating a predetermined key of a keypad. Then, the user may move the second box 12 by using a number of direction keys and a navigation key. As the second box 12 is moved, a portion of a desired web page currently being displayed on the display screen 1 is moved accordingly.

For example, the user may select the second box 12 by manipulating an OK key 31. Then, the user may move the second box 12 vertically and/or horizontally in the first box 11 by using a number of direction keys 32.

Also, the user may select the second box 12 using the OK key 31, and then enlarge or reduce the second box 12 using a side key which is provided on a lateral side of a mobile communication terminal. Also, the user may alter the size of the second box 12 and the size of the current web page portion by using an arbitrary key of a keypad.

If the second box 12 is enlarged, the current web page portion may be zoomed out so that a larger portion of the desired web page than the current web page portion can be displayed on the display screen 1. On the other hand, if the second box 12 is reduced, the current web page portion may be zoomed in so that a smaller portion of the desired web page than the current web page portion can be displayed on the display screen 1. The OK key 31, up, down, left, and right keys and a side key may be arbitrarily used to receive a command to select, enlarge or reduce the second box 12.

According to the embodiment of FIG. 3, screen location information of the current web page portion may be provided using two transparent boxes, where one of the two transparent boxes may have the same size as the entire display screen 1.

Alternatively, coordinate information regarding the location of the current web page portion may be displayed on the display screen 1. Still alternatively, the ratio of the size of the current web page portion to the size of the desired web page may be semitransparently displayed on a predetermined portion of the display screen 1.

The ratio of the size of the current web page portion to the size of the desired web page may be displayed as a percentage on an upper or lower portion of the display screen 1 or on one side of the display screen 1. Location information of the current web page portion may be represented using acronyms such as N (north), S (south), W (west), E (east), NS (north south) or NW (north west), and the location information may also be displayed on the display screen 1 along with the ratio of the size of the current web page portion to the size of the desired web page.

The display screen 1 of the display module 10 may be rectangular. In this case, a number of rectangles may be used to represent the relative location of the current web page portion to the desired web page. However, the present invention is not restricted to this. In other words, if the display screen 1 of the display module 10 may have a shape, other than a rectangular shape. In this case, a navigation window that conforms to the shape of the display screen 1 may be configured, and location information of the current web page portion may be provided using the navigation window.

A navigation window for representing location information of the current web page portion may be disposed at an upper or lower portion of the display screen 1 or on the left or right side of the display screen 1. If the navigation window interferes with the user's viewing of the display screen 1, the transparency of the navigation window may be adjusted, or the navigation window may be removed.

Figure 6:
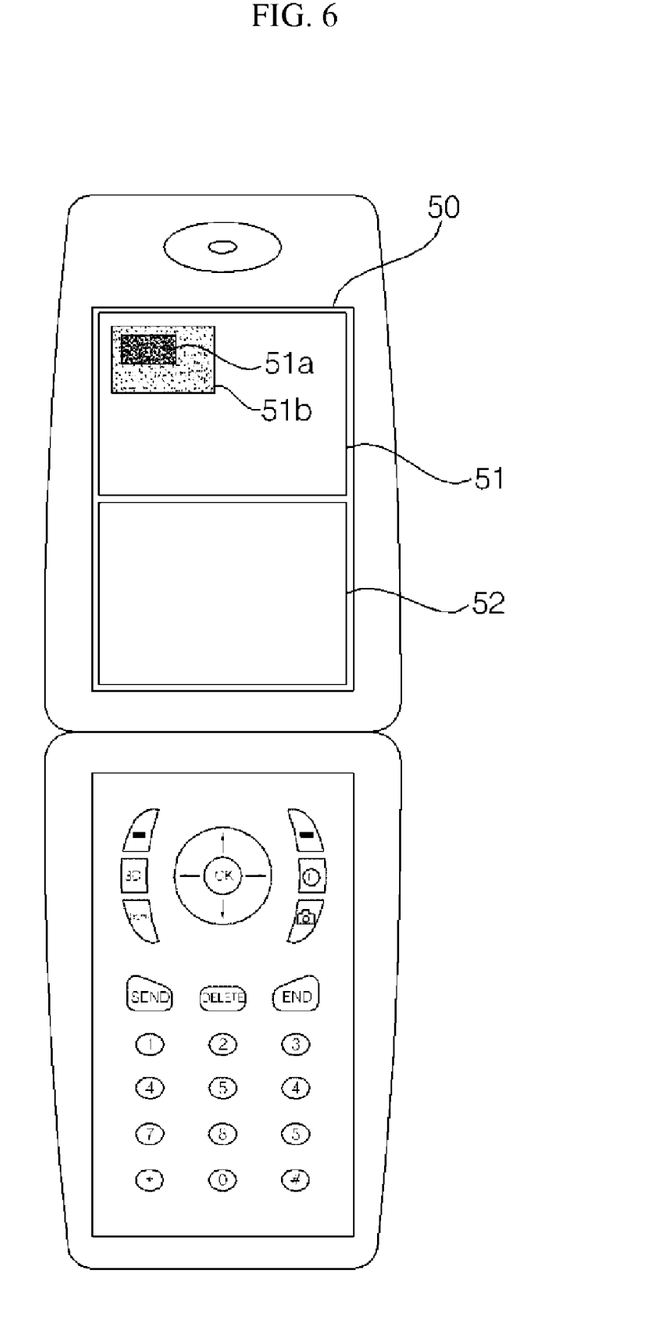
FIG. 6 illustrates a screen displayed by a display module of a mobile communication terminal according to another embodiment of the present invention.
Figure 8:
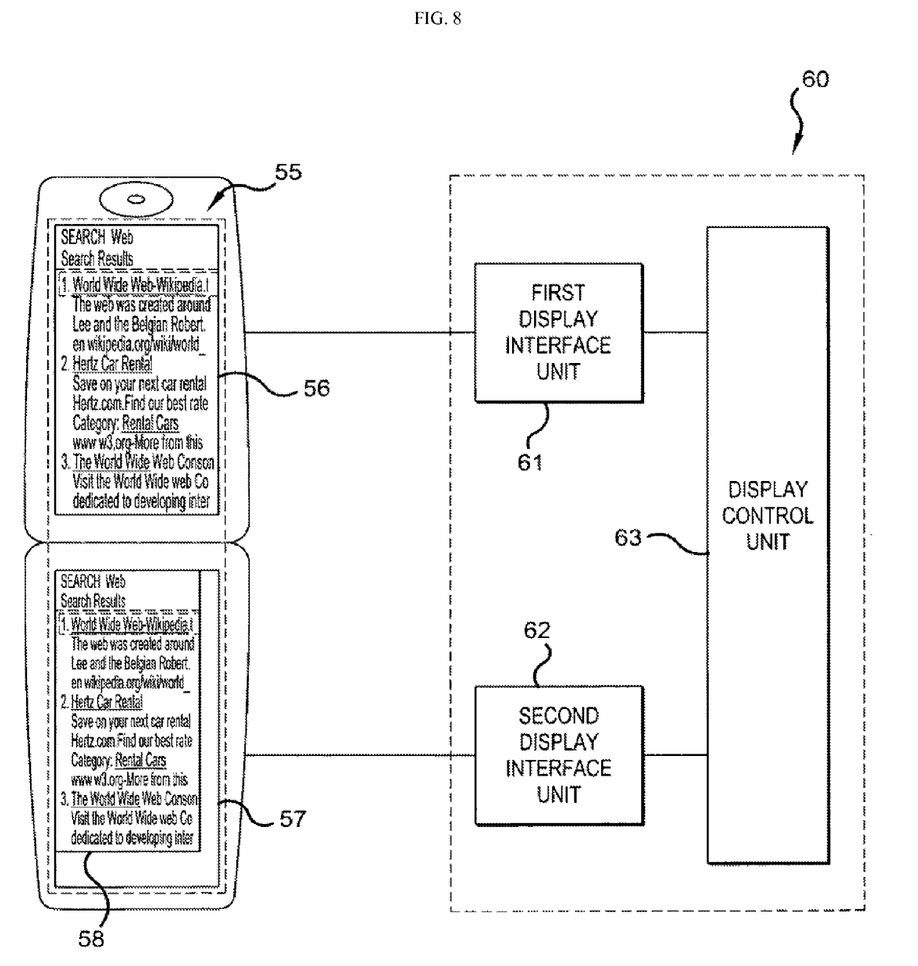
FIG. 8 illustrates a screen displayed by a display module of a mobile communication terminal according to another embodiment of the present invention.

FIG. 6 illustrates a mobile communication terminal according to another embodiment of the present invention, and FIG. 8 illustrates a mobile communication terminal according to still another embodiment of the present invention. Referring to FIGS. 6 and 8, a display object desired by a user and a portion of the desired display object are both displayed by a display module 50. More specifically, FIG. 6 illustrates the situation when the display module 50 includes an LCD or an OLED. Referring to FIG. 6, the screen of the display module 50 is divided into an upper display area 51 and a lower display area 52. A portion of a display object desired by a user may be displayed in the first display area 51, and the desired display object may be displayed as a whole in the second display area 52. Alternatively, a portion of the desired display object may be displayed in the second display area 52, instead of being displayed in the first display area 51, and the desired display object may be displayed as a whole in the first display area 51, instead of being displayed in the second display area 52. Also, the mobile communication terminal illustrated in FIG. 6 may be set so that the display module 60 can only display either a portion of the desired display object or the entire desired display object.

If a portion of a display object desired by the user is displayed in the first display area 51 of the display module 50 and the desired display object is displayed as a whole in the second display area 52 of the display module 50, as illustrated in FIG. 6, a control module (not shown) may display a navigation window to be displayed either in the first display area 51 or in the second display area 52. Thus, the user can easily determine which part of the desired display object is currently being displayed using the navigation window. Referring to FIG. 6, the navigation window includes first and second boxes 51a and 51b. Thus, the user may enlarge or reduce the display object portion currently being displayed either in the first display area 51 by selecting the second box 51b and then enlarging or reducing the second box 51b.

In the embodiment of FIG. 6, like in the embodiment of FIG. 3, the first box 51b may be enlarged to the extent that the size of the first box 51b becomes the same as the size of the first display area 51 or the size of the second display area 52.

The navigation window may be displayed in the first display area 51, as illustrated in FIG. 6. In this case, the first box 51a corresponds to the desired display object displayed as a whole in the second display area 52, and the second box 52b represents the relative location and size of the display object portion displayed in the first display area 51 to the desired display object.

Figure 7:
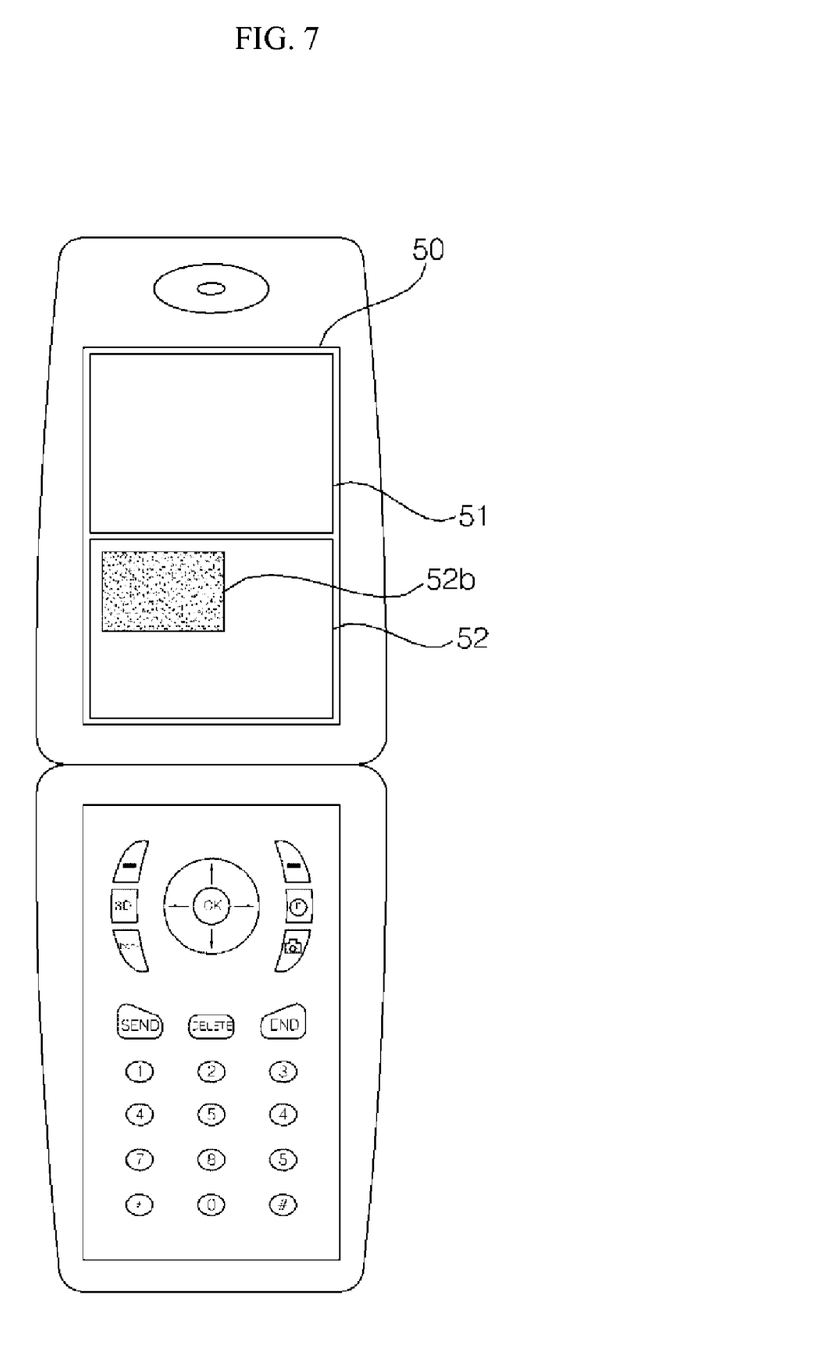
FIG. 7 illustrates a screen obtained by varying the size of a navigation window of FIG. 6.

Alternatively, the navigation window may be displayed in the second display area 52, as illustrated in FIG. 7. In this case, the first box 51a may be enlarged to the extent that the size of the first box 51a becomes the same as the size of the second display area 52. Then, the user can determine the relative location of the display object portion displayed in the first display area 51 to the desired display object displayed as a whole in the second display area 52 based on the relative location and size of a second box 52b to the second display area 52. The second box 52b may overlap part of the desired display object corresponding to the display object portion displayed in the first display area 51.

FIG. 8 illustrates a mobile communication terminal according to another embodiment of the present invention. Referring to FIG. 8, the mobile communication terminal includes a display module 55. The display module 55 is physically divided into two display modules: a first display unit 56 and a second display unit 57. The second display unit 57 displays a display object desired by a user as a whole. The second display unit 57 may include a touch screen. Part of the display object displayed by the second display unit 57 may be enlarged, and then displayed by the first display unit 56. The first display unit 56 may include an LCD.

However, the present invention is not restricted to those set forth herein. In other words, a display object desired by the user may be displayed by the first display unit 56, and part of the display object may be displayed by the second display unit 57. Also, if the mobile communication terminal illustrated in FIG. 8 is equipped with an additional key input tool, the second display unit 57 may include an LCD, instead of a touch screen, and the first display unit 56 may include a touch screen, instead of an LCD.

Referring to FIG. 8, the mobile communication terminal also includes a control module 60 which controls the display of a display object by the display module 55. Since the display module 55 includes the first display unit 56 and the second display unit 57, the control module 60 includes a first display interface unit 61, a second display interface unit 62, and a display control module 63.

The first and second display interface units 61 and 62 and the display control module 64 may be separate hardware elements of the control module 60. Alternatively, the first and second display interface units 61 and 62 and the display control module 64 may not be physically separate, and may be distinguished from one another by their functions.

The control module 60 may display screen location information regarding the relative location of a portion of a display object which is displayed by the first display unit 56 or by the second display unit 57 to the entire display object using a navigation window.

In the embodiment of FIG. 8, like in the embodiment of FIG. 6, the navigation window may be displayed on a display screen of the first display unit 56 or on a display screen of the second display unit 57 through default settings or user settings. The navigation window may be displayed on the display screen of the second display unit 57 using a second box 58, as illustrated in FIG. 8.

Referring to FIG. 8, a display object portion displayed by the first display unit 56 corresponds to an upper left portion of a corresponding display object desired by a user. Thus, the second box 58 is disposed at the upper left corner of the display screen of the second display unit 57, and displays the display object portion displayed by the first display unit 58. The second box 58 may be semitransparent so as to be easily recognized by the user. However, if the navigation window including the second box 58 causes inconvenience to the user, it may be removed. If the second display unit 57 includes a touch pad, the display object portion displayed by the first display unit 56 may be moved or enlarged/reduced by selecting the second box 58 and dragging the second box 58 on the touch screen.

Figure 9:
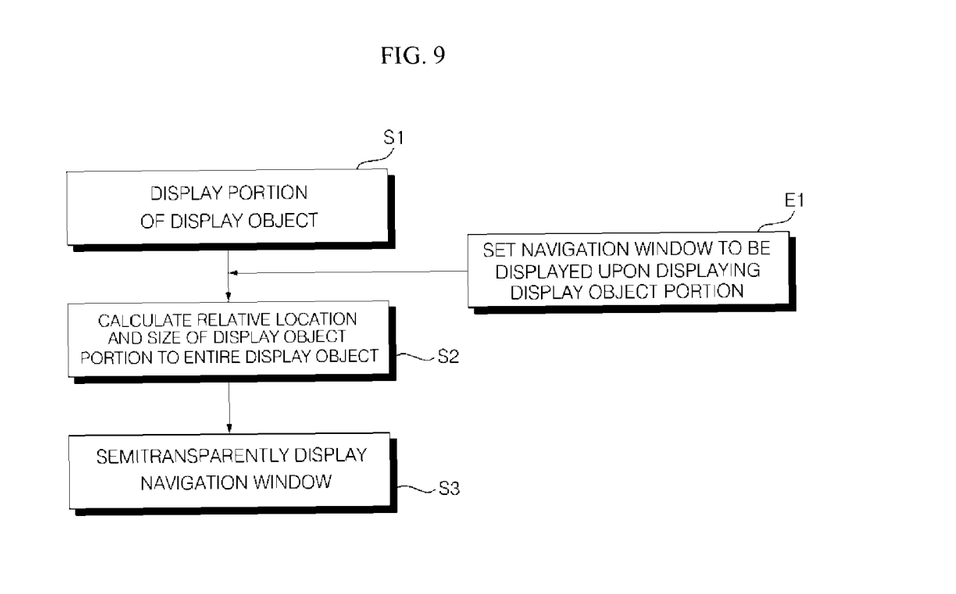
FIG. 9 illustrates a flowchart of a method of controlling a mobile communication terminal according to an embodiment of the present invention.

FIG. 9 is a flowchart illustrating a method of controlling a mobile communication terminal which displays screen location information, according to an embodiment of the present invention. Referring to FIG. 9, a portion of a display object desired by a user is displayed on a display screen of a display module of a mobile communication terminal (S1). If the display screen of the display module of the mobile communication terminal is divided into two or more display areas or if the mobile communication terminal includes two or more display modules, the display object portion and the display object may both be displayed.

A navigation window may be set to be displayed on the display screen of the display module upon displaying the display object portion (E1). Then, a control module of the mobile communication terminal determines the relative location and size of the display object portion to the entire display object (S2).

Thereafter, the control module displays a navigation window which includes a first box and a second box disposed inside the first box according to the results of the determination performed in S2 (S3). The size of the first box may be the same as the size of the display screen of the display module.

Therefore, the user can easily determine which part of the display object is currently being displayed on the display screen of the display module using the navigation window.

Figure 10:
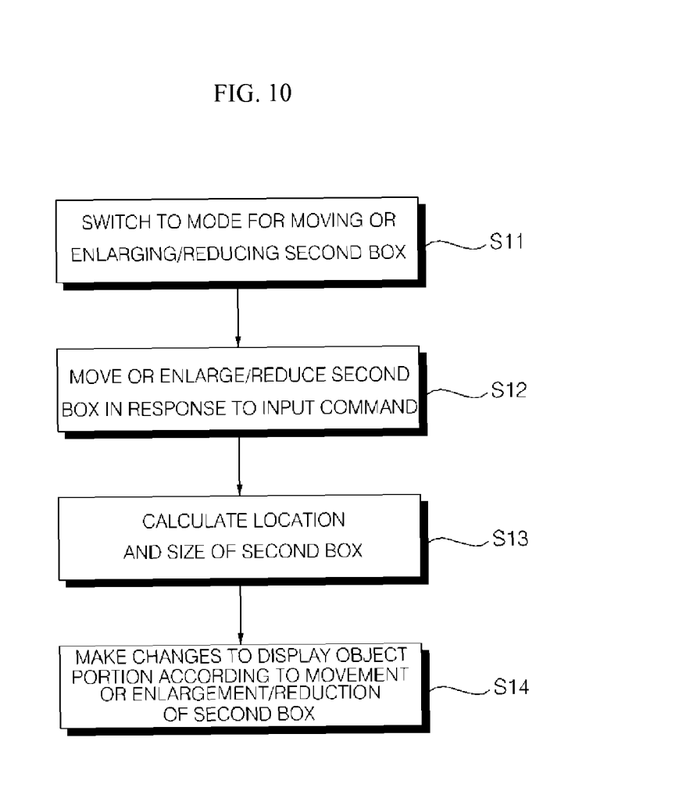
FIG. 10 illustrates a flowchart of a method of controlling a mobile communication terminal according to another embodiment of the present invention.

FIG. 10 is a flowchart illustrating a method of controlling a mobile communication terminal which displays screen location information, according to another embodiment of the present invention. Referring to FIG. 10, a mobile communication terminal is switched to a movement mode for moving a second box which is displayed on a display screen of a display module of the mobile communication terminal or to an enlargement/reduction mode for enlarging/reducing the second box in response to a predefined key input (S11). If the display module includes a touch screen, the mobile communication terminal may be switched to the movement mode or to the enlargement/reduction mode by touching the touch screen in a predefined manner.

A control module of the mobile communication terminal moves or enlarges/reduces the second box according to the manipulation of a number of direction keys on a keypad by the user (S12). If the display module includes a touch screen, the second box may be moved or enlarged/reduced by dragging the second box on the touch screen.

The control module calculates the relative location and size of the second box to the first box (S13). If the size of the first box is the same as the size of the display screen of the display module, the control module calculates the relative location and size of the second box to the display screen of the display module.

Thereafter, the control unit moves or enlarges/reduces a display object portion according to the movement or the enlargement/reduction of the second box (S14). The user can make changes to a display object portion currently being displayed by the display module by varying the size and location of the second box.

A display object that can be displayed by the mobile communication terminal according to the present invention may be an Internet web page. However, the present invention is not restricted to this. In other words, the present invention can be applied to various screen images such as global position system (GPS) screen images or subway route maps. Therefore, the display of a navigation window on a display screen or the display of screen information on a display screen is within the scope of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile communication terminal, comprising:
  a display module configured to display a portion of a display object; and
  a control module configured to control the display module to display screen location information using a first box and a second box, the screen location information indicating a relative location of the portion of the display object with respect to an entire portion of the display object,
  wherein the control module is further configured to control the display module to move or enlarge/reduce the second box by moving or enlarging/reducing the display object in response to a touching manner of the display module, and
  wherein the second box is disposed inside the first box and represents the relative location and a size of the portion of the display object with respect to the entire portion of the display object.

2. The mobile communication terminal of claim 1, wherein the first box represents a size of the entire portion of the display object.

3. The mobile communication terminal of claim 2, wherein the size of the first box is the same as a size of a display screen of the display module.

4. The mobile communication terminal of claim 2, wherein the display module includes a touch screen, and
  wherein the control module is further configured to control the display module to move or enlarge/reduce the second box when the display object is dragged on the touch screen.

5. The mobile communication terminal of claim 1, wherein the control module is further configured to switch the mobile communication terminal to a mode for moving or enlarging/reducing the second box, when the display module is touched in a predefined manner.

6. The mobile communication terminal of claim 1, wherein the control module is further configured to control the display module to semitransparently display the screen location information.

7. The mobile communication terminal of claim 1, further comprising:
  a wireless communication unit configured to receive data that constitutes the display object.

8. The mobile communication terminal of claim 1, wherein the second box represents the relative location of the portion of the display object portion by being displayed on the entire portion of the display object, and
 wherein the entire portion of the display object is displayed inside the first box.

9. The mobile communication terminal of claim 1, wherein the display object is a webpage.

10. A method of controlling a mobile communication terminal, the method comprising:
 displaying, on a display module of the mobile terminal, a portion of a display object;
 displaying, via a control module controlling the display module, screen location information using a first box and a second box, the screen location information indicating a relative location of the portion of the display object with respect to an entire portion of the display object; and
 moving or enlarging/reducing the second box by moving or enlarging/reducing the display object in response to a touching manner of the display module,
 wherein the second box is disposed inside the first box and represents the relative location and a size of the portion of the display object with respect to the entire portion of the display object.

11. The method of claim 10, wherein the first box represents a size of the entire portion of the display object.

12. The method of claim 11, wherein a size of the first box is the same as a size of a display screen of the display module which displays the portion of the display object.

13. The method of claim 11, wherein the display module includes a touch screen, and
 wherein the movement or the enlargement/reduction of the second box includes moving or enlarging/reducing the second box when the display object is dragged on the touch screen.

14. The method of claim 10, further comprising:
 switching the mobile communication terminal to a mode for moving or enlarging/reducing the second box when the display module is touched in a predefined manner.

15. The method of claim 10, wherein the display of the screen location information includes semitransparently displaying the screen location information.

16. The method of claim 15, wherein the display module includes first and second display units,
 wherein the first display unit displays the portion of the display object and the second display unit displays the entire portion of the display object, and
 wherein the display of the screen location information includes displaying the screen location information on a display screen of one of the first and second display units.

* * * * *